April 17, 1962  R. L. JAESCHKE ET AL  3,030,529
OIL-COOLED AND -LUBRICATED ELECTRIC MACHINE COOLING SYSTEM
Filed March 28, 1960  2 Sheets-Sheet 1

Ralph L. Jaeschke,
Richard J. Derks,
Inventors.
Koenig and Pope,
Attorneys.

April 17, 1962  R. L. JAESCHKE ET AL  3,030,529
OIL-COOLED AND -LUBRICATED ELECTRIC MACHINE COOLING SYSTEM
Filed March 28, 1960  2 Sheets-Sheet 2
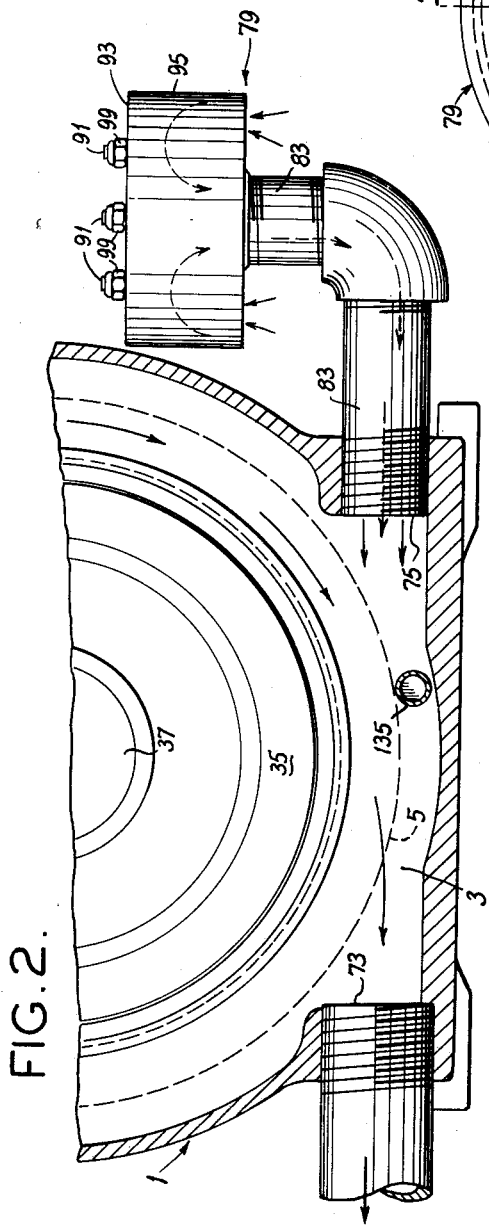
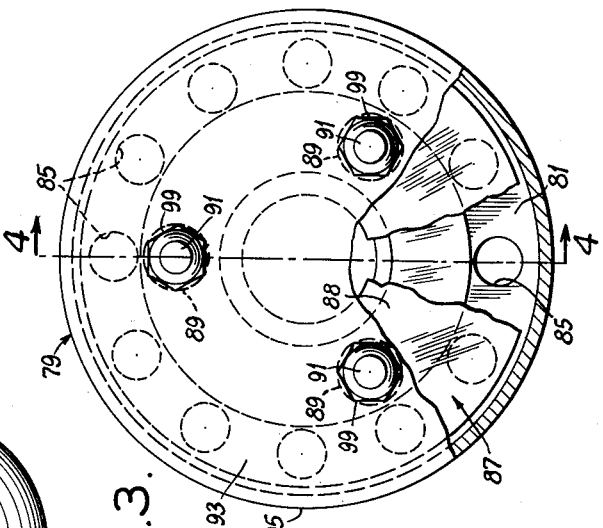
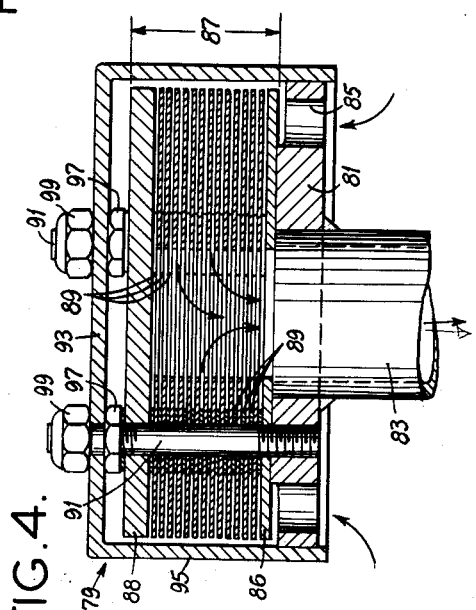
Ralph L. Jaeschke,
Richard J. Derks,
Inventors.
Koenig and Pope,
Attorneys.

United States Patent Office 3,030,529
Patented Apr. 17, 1962

3,030,529
OIL-COOLED AND -LUBRICATED ELECTRIC
MACHINE COOLING SYSTEM
Ralph L. Jaeschke and Richard J. Derks, Kenosha, Wis., assignors to Eaton Manufacturing Company, Cleveland, Ohio, a corporation of Ohio
Filed Mar. 28, 1960, Ser. No. 17,993
1 Claim. (Cl. 310—53)

This invention relates to liquid-cooled electric machines, and with regard to certain more specific features, to liquid-cooled electric couplings or clutches of the eddy-current type, including coolant circuits therefor.

Among the several objects of the invention may be noted the provision of an improved liquid-cooled coupling system in which some of the liquid is employed in controlled quantity for the purpose of controlled lubrication of bearings; the provision of a coupling system of the class described which requires no separate pressurizing for the bearing lubrication; and the provision of a coupling of this class having a lubricant- and coolant-circulating system which minimizes the size of the pump motor required. Other objects will be in part apparent and in part pointed out hereinafter.

The invention accordingly comprises the elements and combinations of elements, features of construction, and arrangements of parts which will be exemplified in the structures hereinafter described, and the scope of which will be indicated in the following claim.

In the accompanying drawings, in which one of various possible embodiments of the invention is illustrated, FIG. 1 is an axial section of a typical eddy-current coupling, showing application of the invention thereto, certain oil circuits being shown diagrammatically;

FIG. 2 is a fragmentary cross section taken on line 2—2 of FIG. 1;

FIG. 3 is an enlarged plan view of a fire-proofing vent device; and,

FIG. 4 is a cross section taken on line 4—4 of FIG. 3.

Corresponding reference characters indicate corresponding parts throughout the several views of the drawings.

Figure 1:
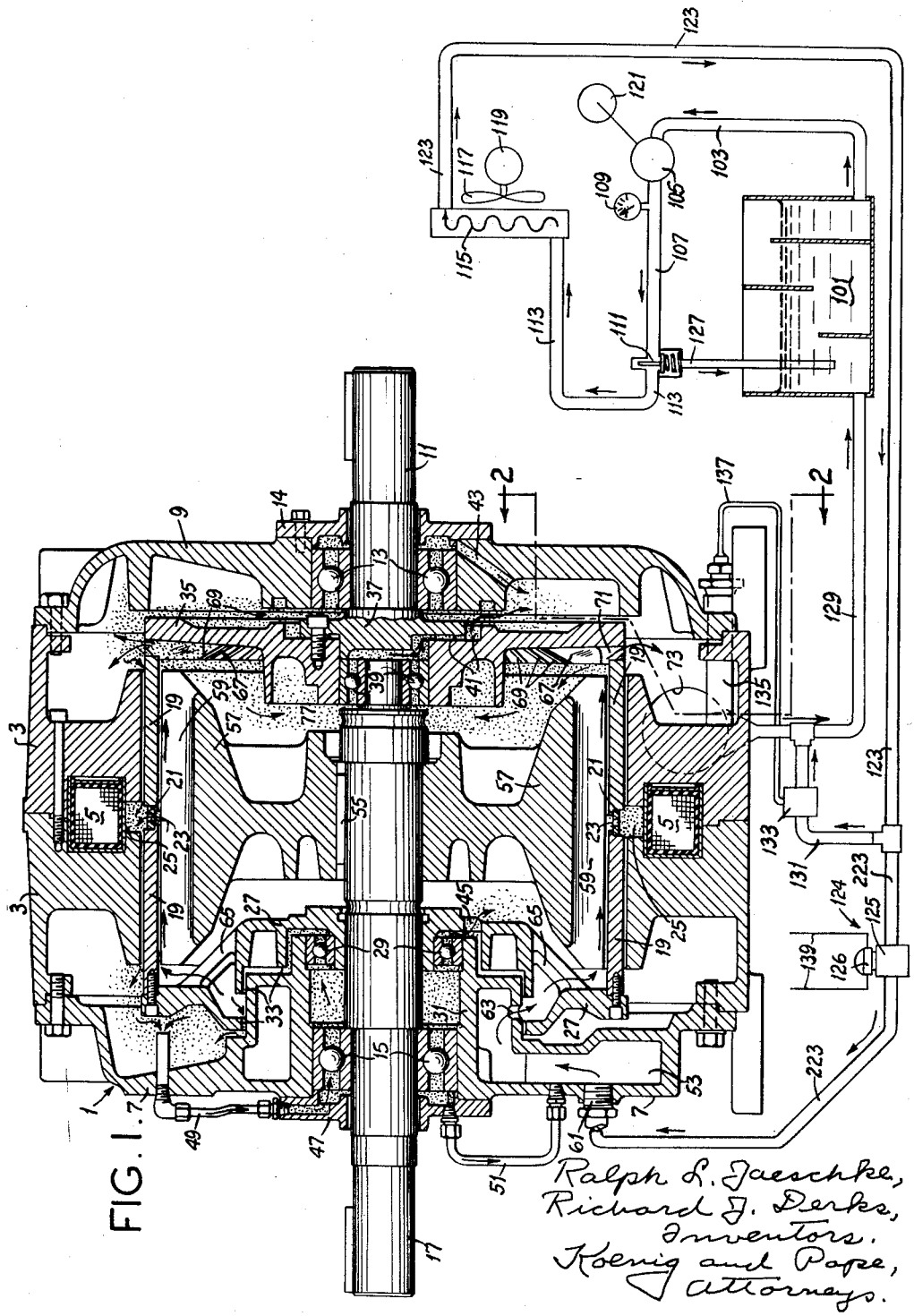

Several systems have heretofore been employed for cooling eddy-current electric couplings, clutches and the like, some employing water and the others oil as a coolant. Water cooling introduces bearing problems because the water must be kept out of the bearings by comparatively elaborate labyrinth seals to prevent flooding. In both former water- and oil-cooled couplings, grease was sometimes used in the bearings. Grease is not an ideal lubricant for roller-type bearings because in driving through the grease, the balls or the like heat and tend to carbonize it at high speeds. In some cases, liquid oil was used as a bearing lubricant employing a separate oil-pressure system therefor. The latter procedure complicated the oil-circulating system. Moreover, the coolant-circulating system heretofore used was of a type for which an excessively large pump motor was required, due to large pressure developed.

According to the present invention, a single improved oil-pressure circulating system is employed for circulating the oil for cooling and for bearing lubrication, which avoids said large pump motor. The new construction affords a sufficient amount (without excess) of oil in mist or vapor form for bearing lubrication, which is conducted in an improved manner through the bearings. Such oil mist lubrication is superior to former lubrication of such machines by grease, or by a flow of liquid oil under pressure in the bearings.

Referring now more particularly to the drawings, numeral 1 indicates a vapor-tight casing of the machine, consisting of two joined magnetic rings 3, adapted to sandwich and support a central annular exciter coil 5. At the ends of the bolted assembly 3 are bolted closure members 7 and 9. A drive shaft 11 is supported in an antifriction ball bearing 13 within the closure member 9. Bearing 13 is exteriorly sealed off by a cover plate 14. Supported on an antifriction ball bearing 15 in the closure member 7 is a driven shaft 17. At 19 are indicated coaxial eddy-current inductor drum-forming members. These are joined by a ring 21 in which are openings 23, located in the plane of the coil 5 opposite a gap 25 between rings 3. Ring 21 may be nonmagnetic, or if magnetic, then thin enough substantially to restrict flow of magnetic flux therethrough.

Bolted to the left end of the drum assembly 19 is a spider 27 which is supported on an antifriction ball bearing 29 carried in a hub 31 of the closure member 7. At 33 are shown close-running flanges operative between members 27 and 31. Welded to the other end of the drum assembly 19 is a disc 35 which is bolted to a flange 37 on the shaft 11. Between the disc 35 and a reduced end of the shaft 17 there is located an antifriction pilot ball bearing 39. An outlet opening 41 connects the space around bearing 39 with the interior of the casing 1. An outlet opening 43 also connects the space around bearing 13 with the interior of the casing 1. Another outlet opening 45 connects the space around and between bearings 15 and 29 with the interior of the drum 19. This space is exteriorly enclosed by a cover plate 47 applied to the closure member 7 around shaft 17. This plate 47 on its upper side is connected by a pipe 49 with the space in the upper portion of the casing 1. The lower portion of the plate 47 is also connected by a pipe 51 with a hollow space 53 in the closure member 7 and surrounding the hub 31.

Keyed to the shaft 17, as shown at 55, is a field pole member 57 having axially disposed pole-forming teeth 59 adjacent the inner surface of the inductor drum assembly 19. An oil inlet to the hollow space 53 is indicated at 61. An oil outlet from said space 53 is indicated at 63. Oil flow from the outlet 63 can pass through openings 65 in the member 27 and into the interior of the drum assembly 19. In order to enforce circulation and escape of this oil, the margin of the disc 35, where it is welded to the drum assembly 19, is provided with spaced radial turbine impeller blades 67, beveled as shown at 69 and between them forming outlets 71.

When coil 5 is excited, a toroidal flux field surrounds it and interlinks members 3, 19 and 59, all of which are magnetic. This field is polarized in the gap between the poles and the interior surfaces of drum 19. In operation, the shaft 11 drives the doubly supported drum 19. Due to said polarization, eddy currents are generated in the drum assembly 19, with resultant heating. The reactive flux field therein drives the field member 57 and therefore also shaft 17. Any oil pumped into the inlet 61 will flow through the hollow space 53, openings 63 and 65 and thence into the drum assembly 19. Oil flowing through the drum assembly 19 is centrifugally forced against its inside and progresses to its outlets 71 where it is centrifugally forced or pumped out radially by the turbine blades 67. This escaped oil is directed tangentially to an outlet 73 located at the bottom and to one side of the casing 1, as shown in FIG. 2. Thus there is a centrifugal pumping action toward this outlet, with some air-aspirating effect tending to reduced pressure in the casing. Opposite the outlet 73 in casing 1 is an air inlet 75 adapted to offset this pressure reduction.

Since, under driving conditions, relative motion exists between the pole-forming teeth 59 and drum 19, and also between the impeller blades 67 and the casing 1, an oil mist is generated within the drum 19, at the openings 23 and at the outlet openings 71. The resulting volume of mist is employed for bearing lubrication. The flanges 33 discourage entry of the mist from inside of drum 19 into the right-hand end of the space surrounding bearings 15 and 29. Some of the volume of mist between the casing 1 and drum 19 enters pipe 49 and passes through bearings 15 and 29 in sleeve 31 and into the drum 19 through port 45. A certain amount of it also may pass through pipe 51 from the space at the left of bearing 15 and into the hollow space 53 for passage to the inside of the drum assembly 19 through openings 63 and 65. The mist that circulates through bearings 15 and 29 is sufficient to lubricate them, any excess circulating back into drum 19.

A portion of the mist formed in the drum assembly 19 passes into the right-hand bearing 39 at the open entry thereto at 77, escaping into the casing 1 through port 41. Part of the mist in the casing 1 enters the left end of bearing 13 and returns to the casing through port 43.

It will be observed from the drawings that, unlike most grease-packed bearings supplied today, the ball bearings 13, 15, 29, 39 do not have the usual self-contained end seals for retaining grease, nor do they have grease in them. However, sealed grease bearings may be adapted to use herein by removing their seals or by puncturing the seals, and in either case removing the grease so that the seals are rendered useless as dams, whereby the oil mist described herein may circulate freely therethrough. In the drawings the bearings are shown for example without any seals.

It will be understood that, while air is aspirated into the inlet 75 to offset reduction in inside pressure due to the pumping action, the fanning actions of the polar teeth 59 and of the impeller blades 67 exert a circulating or pumping action of the oil liquid and mist toward and into the outlet 73 (FIG. 2). The introduction of this air may generate a combustible mixture in the machine which could possibly be ignited by some unusual failure in the electrical system therein. The machine is built heavily enough to prevent any resulting internal pressure rise from breaking it. However, to prevent any resulting flame from spurting from the inlet 75, it is provided with a metallic flame suppressor shown generally at numeral 79.

Flame suppressor 79 consists of a base plate 81, welded to the end of a pipe 83 that extends to the inlet 75. The plate 81 has air inlets 85 and carries thereon a stack of annular plates 87, separated by spacer washers 89 located around pillar bolts 91. The bolts 91 pass through openings in the washers 89 and in the plates 87 and are threaded into the base plate 81. For rigidity, the lowermost and uppermost members 86 and 88 of the stack of plates 87 are made heavier than the remainder, the uppermost plate 88 being held down by nuts 97 on the bolts 91. A cover 93, having a skirt 95 closely surrounding and contacting the base plate 81 but spaced from plates 87, is supported on the nuts 97 of the bolts 91. Lock nuts 99, on the upper ends of the bolts 91, hold the cover in place. Thus any backfire or flashback through the flame suppressor 79 is subject to a large area of heat absorption and cooling below flame-supporting temperatures. This makes the coupling safe for use in explosively hazardous surrounding atmospheres.

Referring again to FIG. 1, there is shown the new circulating system for the electric coupling as above described, or other analogous machines requiring coolant to be pumped to them. This system consists of an oil sump 101 connected by suction pipe 103 with an oil pump 105. The pressure outlet 107 of the pump (having a pressure gauge 109) passes through a pressure relief valve 111 to a line 113 leading to a heat exchanger or radiator 115 cooled by air from a fan 117 driven by a motor 119. Valve 111 opens if, due to clogged lines or the like, the pressure rises unduly. When open, it sends oil back to the sump 101 via pipe 127. A suitable driving motor 121 is provided for the pump 105 which, for reasons to be given, is smaller than motors which have heretofore been used for former coolant-circulating systems.

Cooled oil from the radiator or heat exchanger 115 is led through a line 123 to the inlet 61. This line includes a control device 124 of the type known as a minimum-flow-controlled switch. This consists of a flow-controlled portion 125 and an operatively connected switch portion 126. Switch portion 126 is connected between terminals of a circuit portion 139. Prescribed flow through line 123, sufficient for cooling the portion 125, causes switch 126 to close, for example. Below this minimum prescribed flow, the switch 126 reverses its position, to open for example. Further details of the device 124 are unnecessary, since it is of a known construction.

The circuit 139 is connected into the usual circuit, including coil 5 as a portion thereof. Operation of switch portion 126 in response to minimum prescribed flow prepares the coil circuit for excitation. In response to less than minimum prescribed flow, the coil is deexcited. Other portions than coil 5 of the exciter circuit are not shown, being of known type such as, for example, shown in U.S. Patents Re. 22,432, 2,277,284, 2,697,794 and others. For example, the switch 126 might be in a line such as 49 in 2,697,794 and open in response to less than minimum prescribed flow. As shown in said patents, the additional parts of the coil exciting circuit may include speed-regulating means.

Oil is returned to the sump 101 from the outlet 73 of the casing 1 through a circulating return line 129. Line 123 has a line connection 131 with line 129 in which is located a thermostatic proportioning valve 133. At 135 is shown a temperature-responsive liquid-filled bulb connected through liquid line 137 with the valve 133. The parts 133, 135, 137 per se are of known type. As the temperature of the oil discharged through opening 73 affects bulb 135, the hydraulic pressure in line 137 is changed and the position of valve 133 is thereby controlled. As the discharge temperature of the oil flowing to the outlet 73 increases, the valve 133 will tend to close and reduce return flow from line 123 to line 129. This diverts more oil into line 223. As the temperature decreases, the valve will tend to open, thus reducing flow to line 223. If the temperature of oil in the casing 1 increases above the control point, more coolant oil will be sent through the coupling to control this temperature; conversely, if the temperature decreases below the control point, less will be sent through. The purpose of this is to prevent overheating caused by an inadequate oil supply or an excess of oil such as may be caused by overcooling. Any excessive oil should be avoided to prevent too great a radial depth of oil on the inside of the cylinders 19 which, if allowed to occur, would cause excessive dipping therein of the polar teeth 59, with consequent undesirable hydraulic coupling effect between the drum assembly 27, 19, 35 on the one hand, and the polar field member 57. Such hydraulic coupling action invites unsteady operation, particularly under conditions of automatic electrical speed control, such as may be used in the exciting circuit for coil 5.

Operation is as follows:

Pump 105 draws oil from sump 101 and sends it under suitable pressure to the inlet 61 through the relief valve 111, heat exchanger 115 and flow switch device 124. When the pressure condition for minimum predetermined flow to avoid burn-out is reached, flow control device 124 closes its switch 126 in line 139 thus closing the excitation circuit for coil 5. Then with shaft 11 driving, an electric coupling is made as above described so that shaft 17 is driven. The usual electric control circuit is set at the desired speed for shaft 17 and maintains the excitation of coil 5 at the proper value under varying conditions, for example load change. Oil entering the inlet 61 passes through the hollow space of the closure member 7 and flows through openings 63 and 65 and is then centrifugally spun out against the inside of drum 19, progressing to the right at a suitable radial depth and being pumped or circulated by blades 67 through the outlets 71 into the casing 1.

In the above process, oil mist is generated, in part by action of the polar teeth 59 and the splashing oil escaping through ports 23, and in part by blades 67. That from ports 23 moves axially in the cylindrical gap between parts 3 and 19. The result is a supply of mist not only in the drum 19 and in the right-hand end of the casing 1, outside of cylinder 19, but also in the left-hand end of the latter outside of the drum. Some mist is forced from drum 19 through the bearing 39 and outlet 41 into the lower right-hand end of casing 1. Some at the upper right-hand end of casing 1 is forced through bearing 13 and returns to the lower right-hand end of casing 1 through opening 43. Mist in the upper left-hand end of casing 1 flows through pipe 49 to the left end of bearing 15. It then passes through both bearings 15 and 29 and returns to the inside of the drum 19 via opening 45. Some also returns to the inside of casing 1 via pipe 51, passage 53 and openings 63 and 65. Thus the mist formed in the drum 19 is augmented by this entering mist flow. Stagnation of mist circulation in bearings 15 and 29 is prevented by the blocking action of the dams 33 against entry of mist into the downstream portions of the space containing these bearings. In view of the above, it will be seen that mist movements, as well as liquid movements within the casing 1, are caused by the casing 1 and the rotatable members 19 and 57 therein being formed to produce a circulation through the casing.

The oil flowing through the drum 19 cools it and in passing through the outlet 73 affects the temperature-sensitive bulb 135 to control valve 133. If the temperature is low, indicating an excessive amount of oil, valve 133 tends to open so that more oil is returned directly to the sump 101 via lines 131 and 129. This reduces the flow into the drum 19. If the flow becomes too small, the temperature will rise at the outlet 73, thus affecting bulb 135 in a manner to cause valve 133 to restrict return flow through connection 131 and increasing the flow to the inlet 61.

The present system has advantages over former ones in which a pump such as 105 was required under low-flow conditions in the coupling to pump through a pressure-relief valve and a reverse-acting valve in a circuit portion which did not include the coupling. This required an excessively large pump. In the present system, back pressure is engendered by the relief valve 111 only under abnormal conditions of a clogged line, which occurs only rarely and of course is not a normal condition of operation. Under such conditions, the pump merely temporarily causes a circulation through the sump. Moreover, in the present system the pump 105 normally has a comparatively free flow from its outlet in alternatively varying amounts through two parallel connections, namely, connection 131 between line 123 and the return line 129, or the connection afforded by the coupling as a whole between line 123 and return line 129. Thus back pressure is held to a minimum, requiring only a comparatively small pump 105. Moreover, this pump not only supplies the coolant oil but that for bearing lubrication. The mist system is advantageous over any separate liquid-lubricating system for the bearings, since it not only saves piping complications but engenders less back-pressure to be supplied by the pump. The term mist as used herein includes vapor.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

Electrical apparatus comprising in combination a liquid-tight casing, relatively rotatable members therein required to be cooled, open-type roller bearings in the casing supporting said members for lubrication by passage of lubricating mist therethrough, said casing having an inlet and an outlet for liquid lubricating coolant, at least one of said relatively rotatable members carrying circulating means adapted upon rotation to form lubricating mist from the liquid coolant, and to circulate said coolant from the inlet to the outlet with entrainment of said mist, the casing and said rotatable members being formed to circulate mist through the open-type bearings during circulation of the liquid coolant, a sump, a pump having a suction connection with said sump and an outlet connection with said inlet, return means from said outlet to said sump, a cross connection between said outlet connection and said return means, said cross connection and said casing forming parallel-connected flow paths between the pump and the sump, the flow over the path formed by the casing being acted upon by said circulating means in the casing, flow control means in said cross connection, thermostatic means operatively connected with said flow control means and responsive to temperature in the casing to reduce flow through the cross connection upon temperature increase in the casing and to increase flow through the cross connection upon temperature decrease, and a heat-dissipating means associated with said outlet connection from the pump.

References Cited in the file of this patent

UNITED STATES PATENTS

| 2,160,778 | Dall | May 30, 1939 |
| 2,676,315 | Kyle | Apr. 20, 1954 |
| 2,688,382 | Georgeff | Sept. 7, 1954 |
| 2,887,593 | Wiedemann | May 19, 1959 |

FOREIGN PATENTS

| 243,258 | Italy | Apr. 2, 1926 |
| 665,772 | Great Britain | Jan. 30, 1952 |